United States Patent Office 3,794,604
Patented Feb. 26, 1974

3,794,604
DIOLEFIN POLYMERIZATION CATALYST COMPOSITION
Morford C. Throckmorton, Akron, and Robert E. Mournighan, Clinton, Ohio, assignors to The Goodyear Tire & Rubber Company, Akron, Ohio
No Drawing. Continuation-in-part of abandoned application Ser. No. 811,261, Mar. 27, 1969. This application Sept. 24, 1971, Ser. No. 183,661
Int. Cl. C08d 1/14
U.S. Cl. 252—431 C          5 Claims

ABSTRACT OF THE DISCLOSURE

There is disclosed a process which comprises the polymerization of at least one conjugated diolefin by contacting said conjugated diolefin, under solution polymerization conditions, with a catalyst system comprising (1) a compound selected from the groups consisting of organoaluminum compounds containing at least one carbon to aluminum bond, (2) an organometallic compound, the metal of which is selected from the class comprising metals of Group III-B of the Periodic Table having atomic numbers of 21, 39 and 57 through 71 inclusive and (3) at least one compound containing one or more halide ions, the improvement comprising preforming and aging the catalyst system with at least one conjugated diolefin in an amount which gives a mole ratio of diolefin to Group III–B metal compound ranging from 0.2/1 to about 3000/1.

---

This application is a continuation of our application Ser. No. 811,261, filed Mar. 27, 1969 and now abandoned.

This invention relates to an improvement in a method for producing an active catalyst for the polymerization of certain diolefins or mixtures of diolefins to polymers having high cis-1,4 content. More specifically, the invention relates to the polymerization of at least one conjugated diolefin to polymers having a high cis-1,4 content. Still more specifically it relates to improved catalysts useful for such polymerization.

It is known that polymerization of conjugated diolefins can be promoted by contacting the diolefin with a catalyst system comprised of (A) a trialkylaluminum or alkylaluminum hydride, (B) a Group III-B metal compound and (C) an alkylaluminum halide. Such catalyst systems polymerize conjugated diolefins, in good yields, to produce polymers having very high cis-1,4 content, which are particularly useful as extenders or substitutes for natural rubber. However, these catalyst systems have the disadvantage in that relatively long reaction times are required to give highly economical yields of polymer.

It is an objective of this invention to provide a method whereby conjugated diolefins such as butadiene or isoprene can be polymerized to a high content of cis-1,4-polybutadiene or polyisoprene, that is, a cis content greater than 85%. Another object is to provide a method whereby mixtures of butadiene and isoprene, mixtures of butadiene and other conjugated diolefins, mixtures of isoprene and other conjugated diolefins and mixtures of other conjugated diolefins can be polymerized to form the corresponding copolymers of high cis-1,4 structure. Another object is to provide a catalyst system by which these polymerizations may be accomplished. Another object is to provide a method of preparing the catalyst system by which these polymerizations may be carried out at increased rates of reaction. Other objects will become apparent as the description proceeds.

We have found an improved process for polymerizing conjugated diolefins by contacting at least one conjugated diolefin, under solution polymerization conditions, with a catalyst system comprising (A) at least one compound selected from the group consisting of organoaluminum compounds containing at least one carbon to aluminum bond, (B) an organometallic compound, the metal of which is selected from the class consisting of metals of Group III–B of the Periodic Table having atomic numbers of 21, 39 and 57 through 71 inclusive, and (C) at least one compound containing a halide ion, to give polymers having a cis-1,4 content greater than 85 percent wherein the improvement comprises preforming and aging the catalyst system with at least one conjugated diolefin in an amount which gives a mole ratio of diolefin to the Group III–B metal compound ranging from 0.2/1 to about 3000/1.

The first or (A) catalyst component, which is an organoaluminum compound containing at least one carbon to aluminum bond, may be defined by the formula:

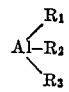

in which $R_1$ is selected from the group consisting of alkyl (including cycloalkyl), alkoxy, aryl, alkaryl, arylalkyl radicals and hydrogen; $R_2$ is selected from the group consisting of alkyl (including cycloalkyl), aryl, alkaryl, arylalkyl radicals and hydrogen and $R_3$ is selected from a group consisting of alkyl (including cycloalkyl), aryl, alkaryl and arylalkyl radicals. Representative of the compounds corresponding to this definition are: diethylaluminum hydride, di-n-propylaluminum hydride, di-n-butylaluminum hydride, diisobutylaluminum hydride, diphenylaluminum hydride, di-p-tolylaluminum hydride, dibenzylaluminum hydride, phenylethylaluminum hydride, phenyl-n-propylaluminum hydride, p-tolylethylaluminum hydride, p-tolyl-n-propylaluminum hydride, p-tolylisopropylaluminum hydride, benzylethylaluminum hydride, benzyl-n-propylaluminum hydride, and benzylisopropylaluminum hydride and other organoaluminum hydrides. Also included are ethylaluminum dihydride, butylaluminum dihydride, isobutylaluminum dihydride, octylaluminum dihydride, amylaluminum dihydride and other organoaluminum dihydrides. Also included are diethylaluminum ethoxide and dipropylaluminum ethoxide. Also included are trimethylaluminum, triethylaluminum, tri-n-propylaluminum, triisopropylaluminum, tri-n-butylaluminum, triisobutylaluminum, tripentylaluminum, trihexylaluminum, tricyclohexylaluminum, trioctylaluminum, triphenylaluminum, tri-p-tolylaluminum, tribenzylaluminum, ethyldiphenylaluminum, ethyl-di-p-tolylaluminum, ethyldibenzylaluminum, diethylphenylaluminum, diethyl-p-tolylaluminum, diethylbenzylaluminum and other triorganoaluminum compounds.

The second or (B) catalyst component of the catalyst system is an organometallic compound of metals of Group III–B of the Periodic Table having atomic numbers of 21, 39 and 57 through 71 inclusive. The metal ion forms the central core or atom to which ligand-type groups or atoms are joined. The resulting compound may be known as a coordination-type compound. For the present invention, the most useful of these coordination compounds comprise metals of Group III–B and ligands represented by organic group consisting of (1) o-hydroxyaldehydes, (2) o-hydrocarbon atoms. These compounds may be symbolically represented as $ML_3$ wherein M represents the above-described metal ions of Group III–B and L is an organic ligand containing from 1 to 20 carbon atoms selected from a group consisting of (1) o-hydroxyaldehydes, (2) o-hydroxyphenones, (3) aminophenols, (4) hydroxy esters, (5) hydroxy quinolines, (6) β-diketones, (7) monocarboxylic acids, (8) ortho dihydric phenols, (9) alkylene glycols, (10) dicarboxylic acids, (11) alkylated derivatives of dicarboxylic acids and (12) phenolic ethers.

Representative Group III-B metals useful in the invention include scandium, yttrium, lanthanum, cerium, praseodymium, neodymium, promethium, samarium, europium, gadolinium, terbium, dysprosium, holmium, erbium, thulium, ytterbium and lutetium. Of these, cerium, neodymium and lanthanum having atomic numbers of 58, 68 and 71 respectively are the most preferred.

The organic portion of the coordination compound includes the organic-type ligands or groups containing from 1 to 20 carbon atoms. These ligands may be of the monovalent and bidentate or divalent and bidentate form. Representative of such organic ligands or groups are (1) o-hydroxyaldehydes such as salicylaldehyde, 2-hydroxyl-1-naphthaldehyde, 2-hydroxy - 3 - naphthaldehyde and the like; (2) o-hydroxyphenones such as 2'-hydroxyacetophenone, 2'-hydroxybutyrophenone, 2' - hydroxypropiophenone and the like; (3) aminophenols such as o-aminophenol, N-methyl o-aminophenol, N-ethyl o-aminophenol and the like; (4) hydroxy esters such as ethyl salicylate, propyl salicylate, butyl salicylate and the like; (5) phenolic compounds such as 2-hydroxyquinoline, 8-hydroxyquinoline and the like; (6) β-diketones such as acetylacetone, benzoylacetone, propionylacetone, isobutyrylacetone, valerylacetone, ethylacetylacetone and the like; (7) monocarboxylic acids such as acetic acid, propionic acid, valeric acid, hexanoic acid, 2-ethylhexanoic acid, neodecanoic acid, lauric acid, stearic acid and the like; (8) ortho dihydric phenols such as pyrocatechol; (9) alkylene glycols such as ethylene glycol, propylene glycol, trimethylene glycol, tetramethylene glycol and the like; (10) dicarboxylic acids such as oxalic acid, malonic acid, maleic acid, succinic acid, o-phthalic acid and the like; (11) alkylated derivatives of the above-described dicarboxylic acids; (12) phenolic ethers such as o-hydroxyanisole, o-hydroxyethyl phenyl ether and the like.

Representative organometallic compounds of the Group III–B metals, corresponding to the formula $ML_3$, which may be useful in this invention include cerium acetylacetonate, cerium naphthenate, cerium neodecanoate, cerium octanoate, tris-salicylaldehyde cerium, cerium tris-(8-hydroxyquinolate), lanthanum naphthenate, lanthanum octanoate, neodymium neodecanoate, neodymium octanoate, yttrium acetylacetonate, yttrium octanoate, dysprosium octanoate and other Group III–B metals complexed with ligands containing from 1 to 20 carbon atoms.

The third or (C) catalyst component of this invention is a compound containing a halide ion. Representative of the halide ions which are within the scope of this invention include bromide ion, chloride ion, fluoride ion and iodide ion and the presence of one or more of these ions is essential in the catalyst system. These halide ions may be introduced as (1) hydrogen halides; (2) alkyl, aryl, alkaryl, aralkyl and cycloalkyl metal halides wherein the metal is selected from Groups II, III–A and IV–A of the Periodic Table; (3) halides of metals of Groups III, IV, V, VI–B and VIII of the Periodic Table and (4) organometallic halides corresponding to the general formula $ML_{(3-y)}X_y$ wherein M is a metal selected from the group consisting of metals of Group III–B of the Periodic Table having atomic numbers of 21, 39 and 57 through 71 inclusive; L is an organic ligand containing from 1 to 20 carbon atoms and selected from the group consisting of (a) o-hydroxyaldehydes, (b) o-hydroxyphenones, (c) hydroxyquinolines, (f) β-diketones, (g) monocarboxylic acids, (h) ortho dihydric phenols, (i) alkylene glycols, (j) dicarboxylic acids, (k) alkylated derivatives of dicarboxylic acids and (l) phenolic ethers; X is a halide ion and y is an integer ranging from 1 to 2 and representing the number of halide ions attached to the metal M. The organic ligand L may be of the monovalent and bidentate or divalent and bidentate form.

Representative examples of such compounds containing a halide ion include (1) hydrogen bromide, hydrogen chloride and hydrogen iodide; (2) ethylmagnesium bromide, butylmagnesium bromide, phenylmagnesium bromide, methylmagnesium chloride, butylmagnesium chloride, ethylmagnesium iodide, phenylmagnesium iodide, diethylaluminum bromide, diisobutylaluminum bromide, methylaluminum sesquibromide, diethylaluminum chloride, ethylaluminum dichloride, ethylaluminum sesquichloride, diisobutylaluminum chloride, isobutylaluminum dichloride, dihexylaluminum chloride, cyclohexylaluminum dichloride, phenylaluminum dichloride, didodecylaluminum chloride, diethylaluminum fluoride, dibutylaluminum fluoride, diethylaluminum iodide, dibutylaluminum iodide, phenylaluminum diiodide, trimethyltin bromide, triethyltin chloride, dibutyltin dichloride, butyltin trichloride, diphenyltin dichloride, tributyltin iodide and the like; (3) aluminum bromide, aluminum chloride, aluminum iodide, antimony pentachloride, antimony trichloride, boron tribromide, boron trichloride, ferric chloride, gallium trichloride, molybdenum pentachloride, phosphorus tribromide, phosphorus pentachloride, stannic chloride, titanium tetrachloride, titanium tetraiodide, tungsten hexachloride and the like and (4) t-butylsalicylaldehydrocerium (III)chloride, salicylaldehydocerium(III) chloride, 5-cyclohexylsalicylaldehydrocerium(III)chloride, 2-acetylphenolatocerium(III)chloride, oxalatocerium(III) chloride, oxalatocerium(III)bromide and the like. The halide ions in the third or (C) component of this invention are labile halide ions.

The conjugated diolefins which may be polymerized in accordance with the above described catalyst system are those aliphatic conjugated diolefins commonly employed in the preparation of synthetic rubber. Representative but not exclusive of such conjugated diolefins are 1,3-dienes such as butadiene-1,3; substituted 1,3-butadienes such as isoprene; 2,3-dimethyl-1,3-butadiene, 2-ethyl-1,3-butadiene; 2-propyl-1,3-butadiene; 2-hexyl-1,3-butadiene; 2,3-diethyl-1,3-butadiene, 2,3-dibutyl-1,3-butadiene; 2-decyl-1,3-butadiene and other substituted butadienes in which the substituent groups contain up to 12 carbon atoms. However, when the substituent groups are more than about 8 carbon atoms, the 1,3-butadienes should be mono-substituted.

The known techniques normally used in the preparation of an active catalyst are the "in situ" and the "preformed" techniques. By "in situ" is meant that the catalyst components are added separately to the monomer to be polymerized. By "preformed" is meant the manner in which the catalyst components are mixed together prior to exposure of any of the components to the monomer to be polymerized. It is also known that when employing the type of catalyst system described in this invention, the presence of monomer is not essential to the formation of an active catalyst species, thus, facilitating the use of "preformed" catalysts. Also, it is known that freshly "preformed" catalysts are frequently more active than catalysts which have been allowed to age before use.

The present invention employs a "preformed" catalyst technique but one which has been greatly improved by "preforming" the catalyst components in the presence of small amounts of a conjugated diolefin and generally the diolefin that is to be polymerized. It has been found that when the catalyst is "preformed" in the presence of a conjugated diolefin, polymerization rates are increased up to 100% or greater. It has also been found that when catalysts that have been "preformed" in the presence of a conjugated diolefin are allowed to age over a period of time ranging from about a minute to several days before use, at temperatures ranging from about 0° C. to about 100° C., catalyst activity is also increased.

Usually the catalyst is prepared by mixing the conjugated diolefin and the catalyst components in the following preferred order: (1) inert solvent, (2) diolefin, (3) trialkylaluminum or dialkylaluminum hydride, (4) Group III–B metal compound and (5) a compound containing a halide ion. Another preferred order of mixing the various components is (1) inert solvent, (2) trialkylaluminum or dialkylaluminum hydride, (3) diolefin, (4) a compound containing a halide ion and (5) a Group III–B metal compound. These preferred orders of mixing the various components, which comprise the active catalyst, are not to be interpreted as excluding other orders of mixing; however, it is generally preferred that the trialkylaluminum or dialkylaluminum hydride always be added prior to the addition of the alkylaluminum halide in order to obtain optimum results.

The conjugated diolefins which are added in small amounts during the "preforming" of the catalyst components to give the improved catalyst system described above, are those aliphatic conjugated diolefins commonly employed in the preparation of synthetic rubber. Representative but not exclusive of such conjugated diolefins are 1,3-dienes such as butadiene-1,3; substituted 1,3-butadienes such as isoprene; 2,3-dimethyl-1,3-butadiene; 2-ethyl - 1,3 - butadiene; 2 - propyl - 1,3 - butadiene; 2-hexyl - 1,3 - butadiene; 2,3 - diethyl - 1,3 - butadiene; 2,3-dibutyl - 1,3 - butadiene; 2 - decyl - 1,3 - butadiene and other substituted butadienes in which the substituent groups contain up to 12 carbon atoms. However, when the substituent groups are more than 8 carbon atoms, the 1,3-butadiene should be mono-substituted.

By the term "inert solvent" is meant that the solvent does not adversely affect the catalyst or its individual components. Such solvents are usually aliphatic, aromatic and cycloaliphatic hydrocarbons, representative of which are pentane, hexane, heptane, benzene, toluene, cyclohexane and the like.

The proportions of the components of the polymerization catalyst compositions of this invention can be varied widely. When the halide ion of the halogen containing compound is bromide, chloride or iodide ion, the atomic ratio of the halide ion to the Group III–B metal can vary from about 0.1/1 to about 6/1. A more preferred ratio is from about 0.5/1 to about 3.5/1 and the most preferred ratio is about 2/1. However, when the halide ion of the halogen-containing compound is fluoride ion, the ratio of the fluoride ion to the Group III–B metal ion ranges from about 20/1 to about 80/1 with the most preferred ratio being about 30/1 to about 60/1. The molar ratio of the trialkylaluminum or alkylaluminum hydride to Group III–B metal can range from about 4/1 to about 200/1 with the most preferred range being from about 8/1 to about 100/1. The molar ratio of diolefin to Group III–B metal can range from about 0.2/1 to 3000/1 with the most preferred range being from about 5/1 to about 500/1.

The amount of catalyst charged to the reduction system can be varied over a wide range; the sole requirement being that a catalytic amount of the catalyst composition, sufficient to cause polymerization of the diolefin, be present in the reaction system. Low concentrations of catalyst are desirable in order to minimize ash problems. It has been found that polymerizations will occur when the catalyst level of the Group III–B metal varies between 0.05 and 1.0 millimole of Group III–B metal per 100 grams of monomer. A preferred ratio is between 0.15 and 0.3 millimole of Group III–B metal per 100 grams of monomer.

The concentration of the total catalyst system employed of course, depends upon factors such as purity of the system, polymerization rate desired, temperature and other factors. Therefore, specific concentrations cannot be set forth except to say that catalytic amounts are used.

The polymerization of the diolefin can be carried out by conventional bulk polymerization procedure or by solution polymerization procedures employing suitable inert solvents. By the term "inert solvent" is meant that the solvent or diluent does not enter into the structure of or affect adversely the resulting polymer. Such solvents are usually aliphatic, aromatic and cycloaliphatic hydrocarbons, representative of which are pentane, hexane, heptane, benzene, toluene, cyclohexane and the like. The solvent/monomer volume ratio may be varied over a wide range. Up to 20 or more to 1 volume ratio of solvent to monomer can be employed. It is usually preferred, or more convenient, to use a solvent/monomer ratio of about 3/1 to about 6/1.

Temperatures at which the polymerization reaction is carried out can be varied over a wide range. Usually the temperature can be varied from extremely low temperatures such as $-60°$ C. up to high temperatures such as $150°$ C. or higher. Thus, the temperature is not a critical factor of the invention. It is generally preferred, however, to conduct the reaction at a temperature in the range of from about $-30°$ C. to about $80°$ C. The pressure at which the polymerization is carried out can also be varied over a wide range. The reaction can be conducted at atmospheric pressure or, if desired, it can be carried out at sub-atmospheric or super-atmospheric pressure. Generally, a satisfactory polymerization is obtained when the reaction is carried out at about autogeneous pressure, developed by the reactants under the operating conditions used.

The practice of this invention is further illustrated by reference to the following examples which are intended to be representative rather than restrictive of the scope of this invention.

The inherent viscosity, which is also known as dilute solution viscosity (DSV), was determined in toluene at $30°$ C. for a number of the polymers reported herein and is an indication of their relative molecular weights. The percent cis-1,4 content of a number of the polymers was determined from infrared diffraction patterns obtained on these polymers.

EXAMPLE I

Preparation of preformed catalysts

The benzene solvent was dried by passing it through a silica gel column under a nitrogen atmosphere. A series of catalysts containing increasing amounts of butadiene was prepared by adding the appropriate amounts of dry benzene, butadiene, diisobutylaluminum hydride (DIBAH), cerium octanoate (CeOct) and ethylaluminum dichloride (EADC) to five 4-ounce bottles. These catalysts are designated A, B, C, D and E respectively. Each catalyst was allowed to age at room temperature (25° C.) for a period of one hour, one day, three days and seven days prior to its use. The table below gives all pertinent data as to the quantities of each of the catalyst components used.

TABLE I

| Catalyst | Millimoles | | | | | Mole ratio, Bd/Ce |
|---|---|---|---|---|---|---|
| | Benzene | Butadiene | DIBAH | CeOct | EADC | |
| A | 1,072 | 0 | 5.37 | 0.27 | 0.27 | 0/1 |
| B | 1,060 | 2.72 | 5.37 | 0.27 | 0.27 | 10/1 |
| C | 1,036 | 8.21 | 5.37 | 0.27 | 0.27 | 30/1 |
| D | 1,010 | 13.71 | 5.37 | 0.27 | 0.27 | 50/1 |
| E | 985 | 19.1 | 5.37 | 0.27 | 0.27 | 70/1 |

EXAMPLE II

A series of polymerizations was carried out on a premix of butadiene as a 21% by weight solution in hexane in four ounce bottles. The amount of preformed catalyst which was prepared as in Example I employed in these polymerizations was the same in each run and contained 4 millimoles of diisobutylaluminum hydride, 0.2 millimole of cerium octanoate and 0.2 millimole of ethylaluminum dichloride per 100 grams of butadiene charged. The control run, which was an in situ catalyst preparation, employed the same amounts of the catalyst components except no butadiene was employed in the preparation of this catalyst because the catalyst was not preformed and each catalyst component was injected into the polymerization mixture separately. The bottles were tumbled in a bath maintained at 50° C. for the reaction times indicated in Tables IIa and IIb. The polymerizations were deactivated by the addition of a suitable stopping agent and antioxidant. Polymer yields and dilute solution viscosities are reported in Tables IIa and IIb. On certain of these polymers the percentage of cis-1,4 content was determined and is reported in Table IIc.

TABLE IIa

| Catalyst | Mole ratio, Bd/Ce | Catalyst aging time | | | |
|---|---|---|---|---|---|
| | | 1 hr. | 1 day | 3 days | 7 days |
| | | Reaction times | | | |
| | | 45 min. | 30 min. | 30 min. | 30 min. |
| | | Polymer yields, weight percent | | | |
| Control [1] | 0:1 | 16 | 11 | 9 | 9 |
| A [2] | 0:1 | 29 | 29 | 28 | 28 |
| B | 10:1 | 37 | 58 | 55 | 58 |
| C | 30:1 | 42 | 61 | 68 | 69 |
| D | 50:1 | 43 | 63 | 68 | 76 |
| E | 70:1 | 42 | 62 | 68 | 76 |

[1] "In situ" catalyst system.
[2] "Preformed" catalysts A through E from Example I.

TABLE IIb

| Catalyst | Mole ratio, Bd/Ce | Catalyst aging time | | | |
|---|---|---|---|---|---|
| | | 1 hr. | 1 day | 3 days | 7 days |
| | | Reaction times | | | |
| | | 45 min. | 30 min. | 30 min. | 30 min. |
| | | Dilute solution viscosity | | | |
| Control [1] | 0:1 | 2.29 | (2) | (2) | 2.67 |
| A [3] | 0:1 | 2.13 | 3.12 | 3.61 | 3.88 |
| B | 10:1 | (2) | (2) | 3.75 | 4.21 |
| C | 30:1 | 2.05 | (2) | (2) | 4.40 |
| D | 50:1 | (2) | (2) | 3.33 | 4.28 |
| E | 70:1 | 1.81 | 2.52 | 2.82 | 3.92 |

[1] "In situ" catalyst addition.
[2] Not determined.
[3] "Preformed" catalysts A through E from Example I.

TABLE IIc

| Catalyst | Mole ratio, Bd/Ce | Catalyst aging time | | | |
|---|---|---|---|---|---|
| | | 1 hr. | 1 day | 3 days | 7 days |
| | | Reaction times | | | |
| | | 45 min. | 30 min. | 30 min. | 30 min. |
| | | Percent cis-1,4 content | | | |
| Control [1] | 0:1 | (2) | (2) | (2) | 97.7 |
| A [3] | 0:1 | 97.1 | (2) | (2) | 98.6 |
| B | 10:1 | (2) | (2) | (2) | 98.6 |
| D | 50:1 | (2) | (2) | (2) | 98.7 |
| E | 70:1 | 96.8 | 97.8 | (2) | (2) |

[1] "In situ" addition of catalyst.
[2] "Preformed" catalysts A through E from Example I.
[3] Not determined.

EXAMPLE III

Three series of polymerizations were conducted in 4-ounce bottles employing a premix solution containing 20 weight percent of butadiene in hexane. Two preformed catalysts and one "in situ" catalyst were used to polymerize the butadiene. One of the preformed catalysts (designated as the A catalyst), was preformed in the presence of isoprene and the other preformed catalyst (designated as the B catalyst), was preformed in the presence of butadiene. The charge of the preformed A and B catalysts employed to polymerize the butadiene contained 12 millimoles of conjugated diolefin, 8 millimoles of diisobutylaluminum hydride (DIBAH), 0.4 millimole of cerium octanoate (CeOct) and 0.4 millimole of ethylaluminum dichloride (EADC). The same charge described above was added to all the bottles. The same amounts of the individual catalyst components were also employed in the "in situ" technique of charging catalyst except additional diolefin was not added. The "in situ" technique was used as a control. The preformed catalysts were injected (a) immediately after preforming, (b) after aging 1 day at 25° C., (c) after aging 2 days at 25° C., and (d) after aging 7 days at 25° C. The polymerizations were carried out at 50° C. for 30 minutes and the pertinent data are summarized in Table III below.

TABLE III

| Catalyst | Preforming monomer | Catalyst aging time, days | | | |
|---|---|---|---|---|---|
| | | 0 | 1 | 2 | 7 |
| | | Polymer yields, weight percent | | | |
| Control [1] | None | 21 | 23 | 22 | 25 |
| A [2] | Isoprene | 53 | 65 | 69 | 79 |
| B [2] | Butadiene | 60 | 81 | 87 | 94 |

[1] "In situ" catalyst addition.
[2] Mole ratio, diolefin:Ce=30:1.

While certain representative embodiments and details have been shown for the purpose of illustrating the invention, it will be apparent to those skilled in this art that various changes and modifications may be made therein without departing from the spirit or scope of the invention.

What is claimed is:

1. A preformed catalyst composition consisting essentially of
   (A) at least one organoaluminum compound corresponding to the formula $AlR_1R_2R_3$ wherein $R_1$ is selected from a group consisting of alkyl, cycloalkyl, alkoxy, aryl, alkaryl and arylalkyl radicals and hydrogen; $R_2$ is selected from the group consisting of alkyl, cycloalkyl, aryl, alkaryl and arylalkyl radicals and hydrogen and $R_3$ is selected from the group consisting of alkyl, cycloalkyl, aryl, alkaryl and arylalkyl radicals,
   (B) at least one organometallic compound corresponding to the formula $ML_3$ wherein M is a metal selected from the group consisting of metals having atomic numbers of 39 and 57 through 71 inclusive and wherein L is an organic acid ligand selected from the group consisting of hydrocarbyl monocarboxylic acids and hydrocarbyl dicarboxylic acids,
   (C) at least one compound, containing at least one halide ion, selected from the group consisting of alkyl, aryl, alkaryl, aralkyl and cycloalkyl metal halides wherein the metal is selected from Groups II–A, III–A and IV–A of the Periodic Table, and
   (D) at least one conjugated diolefin wherein the mole ratio of catalyst component (D) to the metal of catalyst component (B) ranges from 5/1 to 500/1, the mole ratio of catalyst component (A) to the metal in catalyst component (B) ranges from 4/1 to 200/1 and the atomic ratio of the halide ion in catalyst component (C) to the metal in catalyst component (B) ranges from 0.1/1 to 6/1 when the halide ion is chloride, bromide or iodide ion and from 20/1 to 80/1 when the halide ion is fluoride ion and wherein said preformed catalyst is aged from about 0° C. to about 100° C. for a period of time ranging from about one minute to about 30 days.

2. The preformed catalyst compositions of claim 1 wherein the organoaluminum compound comprising the (A) catalyst component is selected from the group consisting of trialkylaluminums and dialkylaluminum hydrides.

3. The preformed catalyst compositions of claim 1 wherein the halide ion in the (C) catalyst component is selected from the group consisting of chloride and bromide ion.

4. The preformed catalyst compositions according to claim 1 wherein the Group III–B metal in the (B) catalyst component is cerium.

5. The preformed catalyst compositions of claim 1 wherein the mole ratio of catalyst component (A) to the metal of catalyst component (B) ranges from 8/1 to 100/1 and the atomic ratio of the halide ion in the (C) catalyst component to the metal in the (B) catalyst component ranges from about 1.5/1 to about 3/1 when the halide ion is chloride, bromide or iodide ion and from 30/1 to 80/1 when the halide ion is fluoride ion.

References Cited
UNITED STATES PATENTS

| | | | |
|---|---|---|---|
| 3,297,667 | 1/1967 | Van Dohlen | 252—431 C X |
| 3,541,063 | 11/1970 | Throckmorton et al. | 252—431 C X |
| 3,528,953 | 9/1970 | Throckmorton | 252—431 C X |
| 3,557,075 | 1/1971 | Gaeth et al. | 260—94.3 |
| 3,464,965 | 9/1969 | Yasunaga et al. | 260—94.3 |
| 3,405,114 | 10/1968 | Naarman et al. | 260—94.3 |

PATRICK P. GARVIN, Primary Examiner

U.S. Cl. X.R.

252—429 B, 431 R, 431 N; 260—94.3

PO-1050
(5/69)

UNITED STATES PATENT OFFICE
CERTIFICATE OF CORRECTION

Patent No. 3,794,604      Dated February 26, 1974

Inventor(s) Morford C. Throckmorton & Robert E. Mournighan

It is certified that error appears in the above-identified patent and that said Letters Patent are hereby corrected as shown below:

Column 1, line 31, "continuation" should be

-- continuation-in-part --.

Column 2, line 62 "group" should be -- groups --;

line 62 "consisting of (1) o-hydroxyaldehydes, (2) o-hy" should be deleted and the following inserted in its place -- described hereinbelow containing from 1 to 20 --.

Column 5, line 50, "reduction" should be -- reaction --.

Signed and sealed this 1st day of October 1974.

(SEAL)
Attest:

McCOY M. GIBSON JR.
Attesting Officer

C. MARSHALL DANN
Commissioner of Patents